(12) United States Patent
Tang (10) Patent No.: US 11,523,432 B2
(45) Date of Patent: Dec. 6, 2022

(54) SIGNAL TRANSMISSION METHOD AND DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 7 days.

(21) Appl. No.: 16/992,498

(22) Filed: Aug. 13, 2020

(65) Prior Publication Data

US 2020/0374930 A1 Nov. 26, 2020

Related U.S. Application Data

(63) Continuation of application No. PCT/CN2018/076903, filed on Feb. 14, 2018.

(51) Int. Cl.
*H04W 74/08* (2009.01)
*H04W 74/00* (2009.01)
(Continued)

(52) U.S. Cl.
CPC ...... *H04W 74/0808* (2013.01); *H04B 7/0626* (2013.01); *H04B 17/318* (2015.01); *H04B 17/336* (2015.01); *H04L 5/0051* (2013.01); *H04L 25/0226* (2013.01); *H04W 24/10* (2013.01); *H04W 56/001* (2013.01);
(Continued)

(58) Field of Classification Search
CPC .. H04B 7/0695; H04B 17/318; H04B 17/327; H04B 17/336; H04B 7/0626; H04B 7/063; H04B 7/0408; H04B 7/0617; H04L 25/0226; H04L 5/0023; H04L 5/0051; H04L 5/0053; H04L 5/0048; H04W 16/14; H04W 24/10; H04W 56/001;
(Continued)

(56) References Cited

U.S. PATENT DOCUMENTS 9,014,733 B2 4/2015 Yu
2010/0210221 A1* 8/2010 Takano ................ H04B 7/0619
455/68
(Continued)

FOREIGN PATENT DOCUMENTS

CN 103918196 A 7/2014
CN 106374984 A 2/2017
(Continued)

OTHER PUBLICATIONS

International Search Report in the international application No. PCT/CN2018/076903, dated Oct. 8, 2018.
(Continued)

*Primary Examiner* — Derrick V Rose
(74) *Attorney, Agent, or Firm* — Perkins Coie LLP (57) ABSTRACT

Disclosed in the present application are a signal transmission method and device. The method comprises: a receiving node receiving a request-to-send signal sent by a sending node; and the receiving node sending, according to the request-to-send signal, an allow-to-send signal to the sending node, the allow-to-send signal comprising beam information concerning N candidate beams.

15 Claims, 2 Drawing Sheets

(51) Int. Cl.
  *H04W 72/04* (2009.01)
  *H04W 24/10* (2009.01)
  *H04L 5/00* (2006.01)
  *H04B 17/318* (2015.01)
  *H04B 17/336* (2015.01)
  *H04B 7/06* (2006.01)
  *H04L 25/02* (2006.01)
  *H04W 56/00* (2009.01)
  *H04W 80/02* (2009.01)

(52) U.S. Cl.
  CPC ....... *H04W 72/046* (2013.01); *H04W 74/008* (2013.01); *H04W 80/02* (2013.01)

(58) Field of Classification Search
  CPC ............. H04W 72/046; H04W 74/008; H04W 74/0808; H04W 74/0816; H04W 80/02
  See application file for complete search history.

(56) References Cited

U.S. PATENT DOCUMENTS

| | | | |
|---|---|---|---|
| 2011/0286403 A1 | 11/2011 | Jain | |
| 2013/0072243 A1 | 3/2013 | Yu | |
| 2017/0118773 A1* | 4/2017 | Cariou | .............. H04W 74/0816 |
| 2017/0171887 A1 | 6/2017 | Shi et al. | |
| 2018/0062770 A1 | 3/2018 | Reial et al. | |
| 2018/0359746 A1* | 12/2018 | Kim | ..................... H04W 74/008 |
| 2019/0104547 A1* | 4/2019 | Xue | ..................... H04W 72/046 |
| 2019/0215140 A1* | 7/2019 | Hafeez | ................. H04B 7/0695 |
| 2020/0059290 A1* | 2/2020 | Pan | ...................... H04B 17/327 |

FOREIGN PATENT DOCUMENTS

| | | |
|---|---|---|
| EP | 2517522 A1 | 10/2012 |
| WO | 2017020293 A1 | 2/2017 |
| WO | 2017111642 A1 | 6/2017 |
| WO | 2017162283 A1 | 9/2017 |

OTHER PUBLICATIONS

Office Action of the Indian application No. 202027038980, dated May 24, 2021. 5 pages with English translation.
Written Opinion of the International Search Authority in the international application No. PCT/CN2018/076903, dated Oct. 8, 2018.
Erdem Ulukan et al: "Angular MAC: a framework for directional antennas in wireless mesh networks", Wireless Networks; The Journal of Mobile Communication, Computation and Information, Kluwer Academic Publishers, Do, vol. 14, No. 2, Jul. 13, 2007 (Jul. 13, 2007), pp. 259-275, XP019582175, ISSN: 1572-8196 * asbtract, Section 3.2; p. 262, right-hand column—p. 264, left-hand column; figure 3 *.
Supplementary European Search Report in the European application No. 18906153.4, dated Dec. 22, 2020.

* cited by examiner

SIGNAL TRANSMISSION METHOD AND DEVICE

CROSS-REFERENCE TO RELATED APPLICATION

This application is a continuation of International Patent Application No. PCT/CN2018/076903 filed on Feb. 14, 2018, the entire content of which is incorporated herein by reference for all purposes.

TECHNICAL FIELD

The embodiments of the present disclosure relate to the field of communication, and more specifically relate to a signal transmission method and device.

BACKGROUND

Data transmission in an unlicensed frequency band is supported in a 5th-Generation (5G) system. A sending node may send a sending signal to a receiving node to request for communication with the receiving node. The receiving node may return a signal to the sending node to indicate that the sending node may transmit data to the receiving node. The sending node may transmit the data to the receiving node only when receiving the signal returned by the receiving node. Therefore, how to improve efficiency of signal transmission between a sending node and a receiving node in an unlicensed frequency band becomes a problem urgent to be solved.

SUMMARY

According to a first aspect, a method for signal transmission is provided. The signal transmission method may include: a request-to-send (RTS) signal sent by a sending node is received by a receiving node; and a clear-to-send (CTS) signal is sent by the receiving node to the sending node according to the RTS signal. The CTS signal may include beam information of N candidate beams, and N may be a positive integer.

According to a second aspect, a method for signal transmission is provided. The signal transmission method may include that: an RTS signal is sent by a sending node to a receiving node; a CTS signal sent by the receiving node according to the RTS signal is received by the sending node, the CTS signal including beam information of N candidate beams, and N being a positive integer; and a channel is sent by the sending node to the receiving node according to the beam information of the N candidate beams.

According to a third aspect, a receiving node is provided. The receiving node may include a processor and a transceiver connected to the processor to perform the operations of the receiving node in the first aspect and the second aspect.

According to a fourth aspect, a sending node is provided. The sending node may include a processor and a transceiver connected to the processor to perform the operations of the sending node in the first and second aspects.

DETAILED DESCRIPTION

The technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a future 5G system.

Figure 1:
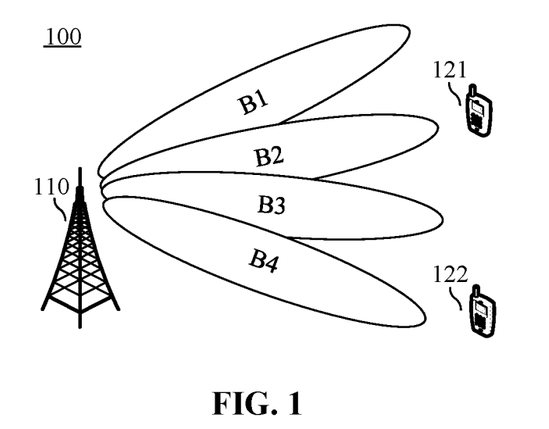
FIG. 1 is a schematic diagram of a wireless communication system applied in an embodiment of the present disclosure.

FIG. 1 shows a wireless communication system 100 applied in an embodiment of the present disclosure. The wireless communication system 100 may include a network device 110. The network device 100 may be a device for communicating with a terminal device. The network device 100 may provide communication coverage for a specific geographic area, and may communicate with a terminal device (such as user equipment (UE)) located within the coverage area. Optionally, the network device 100 may be a base transceiver station (BTS) in the GSM or the CDMA system, or may be a nodeB (NB) in the WCDMA system, or may be an evolutional node B (eNB or eNodeB) in the LTE system or a wireless controller in a cloud radio access network (CRAN), or the network device may be a relay station, an access point, an in-vehicle device, a wearable device, a network side device in a future 5G network, or a network device in a future evolved Public Land Mobile Network (PLMN), and the like.

The wireless communication system 100 may further include at least one terminal device, such as a terminal device 121 and a terminal device 122, located within a coverage area of the network device 110. The terminal device 121 and the terminal device 122 may be mobile or fixed. Optionally, the terminal device 121 and the terminal device 122 may be an access terminal, User Equipment (UE), a user unit, a user station, a mobile station, a mobile platform, a remote station, a remote terminal, a mobile device, a user terminal, a terminal, a wireless communication device, a user proxy or a user apparatus. The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device or other processing devices connected to a wireless modem, an in-vehicle device, a wearable device, a terminal device in a future 5G network, or a terminal device in a future evolved PLMN, and the like. Optionally, Device to Device (D2D) communication may also be performed between the terminal device 121 and the terminal device 122.

FIG. 1 exemplarily illustrates a network device and two terminal devices. Optionally, the wireless communication system 100 may include a plurality of network devices and a coverage range of each network device may include other numbers of terminal devices, which is not limited in the embodiments of the present disclosure.

Optionally, the wireless communication system 100 may further include other network entities, such as a network controller and a Mobility Management Entity (MME), which is not limited in the embodiments of the present disclosure.

In a 5G system, the frequency band used for data transmission is higher than the frequency band used in LTE, so the path loss of wireless signal transmission may increase and coverage of a wireless signal may decrease. To this end, a beamforming technology is proposed in the 5G system to increase the gain of a wireless signal, thereby making up for the path loss. Specifically, a beam configured by a BTS to send a signal to a terminal device has directivity. Different beams actually correspond to different transmission directions. Each narrow beam can only cover part of a cell area rather than all areas in the cell. For example, FIG. 1 shows four beams in different directions, that is, beam B1, beam B2, beam B3 and beam B4. The BTS may transmit signals to the terminal device through the four beams in different directions. Beam B1 and beam B2 can cover the terminal device 121 instead of the terminal device 122. Beam B3 and beam B4 can cover the terminal device 122 instead of the terminal device 121. The BTS may send a signal to the terminal device 121 through beam B1 and beam B2, and send a signal to the terminal device 122 through beam B3 and beam B4.

The following briefly introduces a Listen Before Talk (LBT) mechanism in an unlicensed frequency band involved in the embodiments of the present disclosure, and a request-to-send (RTS)/Clear-To-Send (CTS) mechanism in a Wireless Fidelity (WiFi) system working at the unlicensed frequency bands.

The 5G system supports data transmission in an unlicensed frequency band. The channel transmission in an unlicensed frequency band is based on the LBT mechanism. That is, before sending data, the sending node needs to sense whether a channel is idle and may only send data after determining that the channel is idle.

Furthermore, for the WiFi system working in an unlicensed frequency band, in order to solve the problem on hidden nodes, the RTS/CTS mechanism is proposed. Hidden stations mean that BTS A sends a signal to BTS B, and BTS C may also send a signal to BTS B when BTS A is not detected. Therefore, BTS A and BTS C can simultaneously send signals to BTS B, causing signal collision, which may eventually cause the signals sent to BTS B to be lost. This problem can be solved through the RTS/CTS mechanism. During the use of RTS/CTS, if an upper limit of the number of bytes to be transmitted is set, then once data to be transmitted is greater than the upper limit, an RTS/CTS handshake protocol may be started. First, BTS A may send an RTS signal to BTS B, indicating that BTS A is to send some data to BTS B. BTS B may send a CTS signal after receiving the RTS signal, indicating that BTS B is ready and BTS A may send data. The rest BTSs that are to send data to BTS B can suspend sending data to BTS B. In this way, real data transfer can start only after the two parties successfully exchange the RTS/CTS signals (that is, the handshake is completed), which ensures that when multiple invisible sending nodes send signals to the same receiving node at the same time, only the node that receives the CTS signal returned by the receiving node can transmit data to the receiving node, thereby avoiding conflicts.

The sending node can transmit data to the receiving node only when it receives the CTS signal returned by the receiving node. Therefore, how to improve the efficiency of signal transmission between the sending node and the receiving node has become an urgent problem to be solved.

In the embodiments of the present disclosure, after the sending node sends the RTS signal to the receiving node, the receiving node may send the CTS signal to the sending node, and by carrying the beam information of the N candidate beams in the CTS signal, the sending node may send channels to the receiving node based on the beam information of the N candidate beams, thereby improving the efficiency of channel transmission between the sending node and the receiving node.

It should be understood that in the embodiments of the present disclosure, the beam used for receiving a signal can be understood as a spatial domain reception filter for receiving a signal; and the beam for sending a signal can be understood as a spatial domain transmission filter for sending a signal. For two signals sent by the same spatial domain transmission filter, it can be said that the two signals are quasi-co-located (QCL) with respect to spatial receiving parameters.

Figure 2:
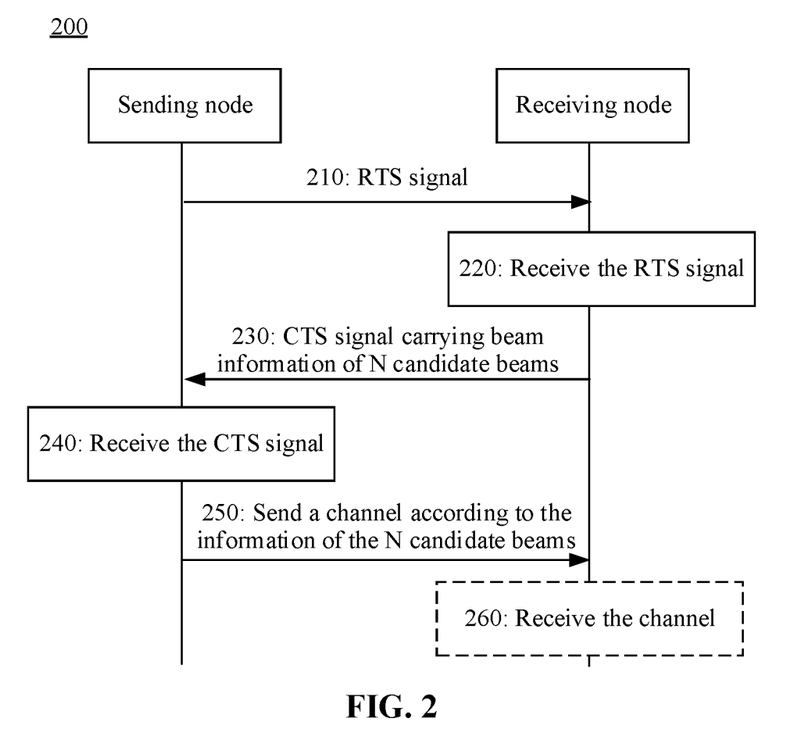
FIG. 2 is an interaction flowchart of a signal transmission method according to an embodiment of the present disclosure.

FIG. 2 is an interaction flowchart of a signal transmission method according to an embodiment of the present disclosure. The sending node and the receiving node as shown in FIG. 2 may be the network device 110, the terminal device 121 or the terminal device 122 as shown in FIG. 1. The method as shown in FIG. 2 may be applied to unlicensed frequency bands. As shown in FIG. 2, the signal transmission method may include a part of or all of the following contents:

In operation 210, an RTS signal is sent by the sending node to the receiving node.

In operation 220, the RTS signal sent by the sending node is received by the receiving node.

In operation 230, a CTS signal is sent by the receiving node to the sending node according to the RTS signal.

The CTS signal may include beam information of N candidate beams, N may be equal to 1, or N is a positive integer greater than 1.

The N candidate beams may be beams recommended by the receiving node to the sending node for channel transmission.

Optionally, the beam information of each candidate beam in the N candidate beams included in the CTS signal may be a signal index of a reference signal sent by each candidate beam used by the sending node.

If the RTS signal is sent by the first beam, the N beams may include the first beam or the N beams may not include the first beam.

Furthermore, the value of N may be configured by the network device, or may be pre-stored in the receiving node.

Optionally, the RTS signal may be at least configured to request channel transmission between the sending node and the receiving node. For example, the RTS signal may include an address of the receiving node, time of a data frame and sending time of an acknowledgement (ACK). The RTS signal may further include another content or have another function. There are no limits made herein.

Optionally, the CTS signal may be at least configured to indicate permission of the channel transmission between the sending node and the receiving node, or further indicate that other nodes are prohibited from performing data transmission between the sending node and the receiving node. The CTS signal may also include other contents or have other functions, which is not limited here.

Specifically, in a WIFI system, the request-to-send signal may be an RTS signal, and the clear-to-send signal may be a CTS signal.

Optionally, before the operation 230, that is, before the CTS signal is sent by the receiving node to the sending node, the method may further include: the beam information of the N candidate beams is determined by the receiving node according to a measurement result obtained by performing signal measurement on a reference signal and/or a sensing result obtained by performing carrier sensing on the N candidate beams.

For example, signal measurement may be performed by the receiving node on a plurality of reference signals sent by the sending node, and N reference signals with optimal measurement results may be selected from the plurality of reference signals according to the measurement results of the plurality of reference signals; and sending beams of the N reference signals may be taken as the N candidate beams by the receiving node.

For another example, carrier sensing (or beam sensing, channel sensing, sensing, etc.) may be performed by the receiving node on a plurality of beams; and N beams may be selected by the receiving node from beams with channels sensed to be idle as the N candidate beams.

For another example, signal measurement may be performed by the receiving node on a plurality of reference signals sent by the sending node to obtain M reference signals with optimal measurement results. M may be a positive integer greater than or equal to N. Carrier sensing may be performed by the receiving node on the sending beams of the M reference signals. N beams may be selected by the receiving node from beams with channels sensed to be idle as the N candidate beams.

For another example, carrier sensing may be performed by the receiving node on a plurality of beams to obtain M beams with channels sensed to be idle. M may be a positive integer greater than or equal to N. Signal measurement may be performed by the receiving node on the reference signals sent on the M beams. Sending beams of the N reference signals with optimal measurement results may be taken as the N candidate beams by the receiving node.

The terminal device may sense that a channel is idle on a certain beam, for example, the power of the reference signal sent on the beam can be less than a preset threshold, and at this time, the channel on the beam may be considered to be idle.

Optionally, the reference signals may include at least one of a channel state indication reference signal (CSI-RS), a sounding reference signal (SRS), and a synchronizing signal block (SSB).

Optionally, the measurement result may include at least one of reference signal receiving power (RSRP), reference signal receiving quality (RSRQ), and signal to interference plus noise ratio (SINK).

For example, the receiving node may select the beams corresponding to one or more reference signals with higher RSRP and/or RSRQ (such as reference signals corresponding to the first few measured values ranked by RSRP and/or RSRQ from high to low) as candidate N beams based on the measurement results of the reference signals, or may select one or more beams with idle channels as the N candidate beams based on the sensing results of beam sensing, or may select the beams corresponding to one or more reference signals with higher RSRP and/or RSRQ from the beams with idle channels as the candidate N beams, or may select one or more idle reference signals from the beams corresponding to the reference signals with higher RSRP and/or RSRQ as the candidate N beams.

In operation 240, the CTS signal sent by the receiving node according to the RTS signal is received by the sending node.

The CTS signal may include beam information of N candidate beams.

In operation 250, a channel is sent by the sending node to the receiving node according to the beam information of the N candidate beams.

Optionally, after the CTS signal is received by the sending node, the channel may be sent to the receiving node by the sending node through one of the N candidate beams carried in the CTS signal.

Or, optionally, after the CTS signal is received by the sending node, the channel may be sent to the receiving node by the sending node through a first beam and a first timer is started; and after the first timer expires, the channel may be sent to the receiving node by the sending node through one of the N candidate beams.

Optionally, after the channel is sent to the receiving node through the first beam, indication information may also be sent by the sending node to the receiving node, and the indication information may be configured to indicate a beam for subsequent channel transmission.

For example, the CTS signal sent by the receiving node to the sending node may include beam information of a second beam. After the sending node receives the CTS signal from the receiving node, the sending beam of the RTS signal, namely the first beam, may be firstly used, by the sending node, to send the channel to the receiving node. Furthermore, when the CTS signal is received by the sending node, the first timer may be started. When the first timer expires, the channel may be sent to the receiving node by the sending node through the second beam.

After that, the indication information may be sent to the receiving node to indicate updated beams for sending channels.

Correspondingly, the indication information may be received by the receiving node to acquire information of the beams updated by the sending node.

For example, the indication information may be carried in control information or media access control (MAC) layer signaling.

Optionally, the channel may include a data channel or a control channel.

Optionally, the method may further include operation 260.

In operation 260, the channel sent by the sending node according to the beam information of the N candidate beams is received by the receiving node.

Therefore, in the embodiments of the present disclosure, after the sending node sends the RTS signal to the receiving node, the receiving node may send the CTS signal to the sending node. By carrying the beam information of the N candidate beams in the CTS signal, the sending node may send a channel to the receiving node based on the beam information of the N candidate beams, thereby improving the efficiency of channel transmission between the sending node and the receiving node.

It should be understood that in various embodiments of the present disclosure, the size of the serial number of each of the above processes does not mean the order of execution. The execution order of each process should be determined by its functions and internal logics, and should not constitute any limitation on the implementation processes of the embodiments of the present disclosure.

The signal transmission method according to the embodiments of the present disclosure is described in detail above. The device according to the embodiments of the present disclosure will be described below with reference to FIG. 3 to FIG. 6. The technical features described in the method embodiments are applicable to the following device embodiments.

Figure 3:
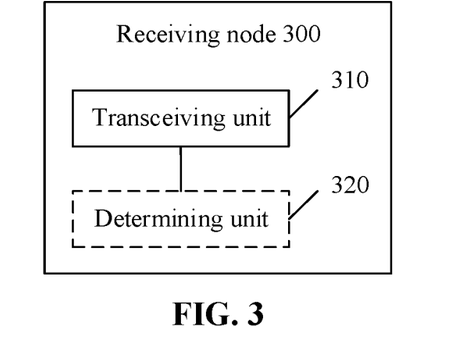
FIG. 3 is a schematic block diagram of a receiving node according to an embodiment of the present disclosure.

FIG. 3 is a schematic block diagram of a receiving node 300 according to an embodiment of the present disclosure. As shown in FIG. 3, the receiving node 300 may include a transceiving unit 310 configured to:

receive an RTS signal from the sending node; and send a CTS signal to the sending node according to the RTS signal, the CTS signal including beam information of N candidate beams, and N being a positive integer.

Therefore, after the sending node sends the RTS signal to the receiving node, the receiving node may send the CTS signal to the sending node. By carrying the beam information of the N candidate beams in the CTS signal, the sending node may send a channel to the receiving node based on the beam information of the N candidate beams, thereby improving the efficiency of channel transmission between the sending node and the receiving node.

Optionally, the RTS signal may be at least configured to request channel transmission between the sending node and the receiving node, and the CTS signal may be at least configured to indicate permission of the channel transmission between the sending node and the receiving node.

Optionally, the transceiving unit 310 is further configured to receive a channel sent by the sending node according to the beam information of the N candidate beams.

Optionally, the receiving node may further include a determining unit 320 configured to: determine the beam information of the N candidate beams according to a measurement result obtained by performing signal measurement on a reference signal, and/or a sensing result obtained by performing carrier sensing on the N candidate beams.

Optionally, the determining unit 320 is specifically configured to: perform signal measurement on a plurality of reference signals sent by the sending node, and select N reference signals with optimal measurement results from the plurality of reference signals according to the measurement results of the plurality of reference signals; and take sending beams of the N reference signals as the N candidate beams.

Optionally, the determining unit 320 is specifically configured to: perform carrier sensing on a plurality of beams; and select N beams as at least one candidate beam from beams with channels sensed to be idle.

Optionally, the determining unit 320 is specifically configured to: perform signal measurement on a plurality of reference signals sent by the sending node to obtain M reference signals with optimal measurement results, M being a positive integer greater than or equal to N; perform carrier sensing on the sending beams of the M reference signals; and select N beams from beams with channels sensed to be idle as the N candidate beams.

Optionally, the determining unit 320 is specifically configured to: perform carrier sensing, by the receiving node, on a plurality of beams to obtain M beams with channels sensed to be idle, M being a positive integer greater than or equal to N; perform signal measurement on the reference signals sent on the M beams; and take sending beams of the N reference signals with optimal measurement results as the N candidate beams.

Optionally, the reference signal may include at least one of a channel state indication reference signal (CSI-RS), a sounding reference signal (SRS), and a synchronizing signal block (SSB).

Optionally, the measurement result may include at least one of reference signal receiving power (RSRP), reference signal receiving quality (RSRQ), and signal to interference plus noise ratio (SINR).

Optionally, the beam information of each candidate beam in the N candidate beams may be a signal index of a reference signal sent by each candidate beam used by the sending node.

Optionally, the RTS signal may be sent by the first beam, and the N candidate beams may include the first beam, or the N candidate beams may not include the first beam.

Optionally, the channel may include a data channel or a control channel.

Optionally, the value of N may be configured by a network device or pre-stored in the receiving node.

It should be understood that the receiving node 300 may perform the corresponding operations performed by the receiving node in the above method 200. For brevity, the details are not described here.

Figure 4:
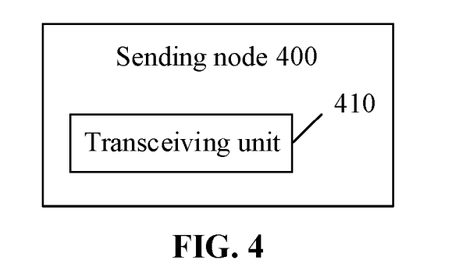
FIG. 4 is a schematic block diagram of a sending node according to an embodiment of the present disclosure.

FIG. 4 is a schematic block diagram of a sending node 400 according to an embodiment of the present disclosure. As shown in FIG. 4, the sending node 400 may include a transceiving unit 410 configured to:

send an RTS signal to the receiving node; receive a CTS signal sent by the receiving node according to the RTS signal, the CTS signal including beam information of N candidate beams, and N being a positive integer; and send a channel to the receiving node according to the beam information of the N candidate beams.

Therefore, after the sending node sends the RTS signal to the receiving node, the receiving node may send the CTS signal to the sending node. By carrying the beam information of the N candidate beams in the CTS signal, the sending node may send a channel to the receiving node based on the beam information of the N candidate beams, thereby improving the efficiency of channel transmission between the sending node and the receiving node.

Optionally, the RTS signal may be at least configured to request channel transmission between the sending node and the receiving node, and the CTS signal may be at least configured to indicate permission of the channel transmission between the sending node and the receiving node.

Optionally, the transceiving unit 410 is specifically configured to: send the channel to the receiving node through one of the N candidate beams after receiving the CTS signal.

Optionally, the transceiving unit 410 is specifically configured to: send the channel through a first beam to the receiving node and start a first timer after receiving the CTS signal; and send the channel to the receiving node through one of the N candidate beams after the first timer expires.

Optionally, the transceiving unit 410 is further configured to: send indication information to the receiving node after sending the channel to the receiving node through the first beam, the indication information being configured to indicate a beam for subsequent channel transmission.

Optionally, the indication information may be carried in control information or media access control (MAC) layer signaling.

Optionally, the beam information of the N candidate beams may be signal indexes of N reference signals respectively sent by the N candidate beams used by the sending node.

Optionally, the RTS signal may be sent by the first beam; and the N beams may include the first beam, or the N beams may not include the first beam.

Optionally, the channel may include a data channel or a control channel.

It should be understood that the sending node 400 may perform the corresponding operations performed by the sending node in the above method 200. For brevity, the details are not described here.

Figure 5:
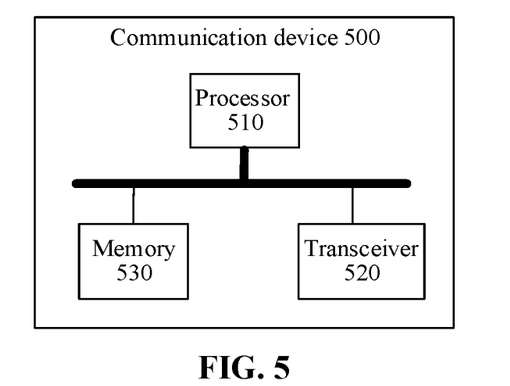
FIG. 5 is a schematic structural diagram of a communication device according to an embodiment of the present disclosure.

FIG. 5 is a schematic structural diagram of a communication device 500 according to an embodiment of the present disclosure. As shown in FIG. 5, the communication device may include a processor 510, a transceiver 520 and a memory 530. The processor 510, the transceiver 520 and the memory 530 can communicate with each other through an internal connection route. The memory 530 is configured to store instructions, and the processor 510 is configured to perform the instructions stored in the memory 530 so as to control the transceiver 520 to receive signals or send signals.

Optionally, the processor 510 may call the program codes stored in the memory 530 to perform the corresponding operations performed by the sending node in the method 200. For brevity, the details are not described here.

Optionally, the processor 510 may call the program codes stored in the memory 530 to perform the corresponding operations performed by the receiving node in the method 200. For brevity, the details are not described here.

It should be understood that the processor according to the embodiments of the present disclosure may be an integrated circuit chip which has a signal processing capability. In an implementation process, each operation of the above method embodiments may be completed by an integrated logic circuit of hardware in the processor or an instruction in a software form. The above processor may be a general-purpose processor, a Digital Signal Processor (DSP), an Application Specific Integrated Circuit (ASIC), a Field Programmable Gate Array (FPGA) or other programmable logic devices, discrete gate or transistor logic devices, and discrete hardware components.

Various methods, operations and logical block diagrams disclosed in the embodiments of the present disclosure may be implemented or performed. The general processor may be a microprocessor or may be any conventional processor. The operations of the method disclosed in combination with the embodiments of the present disclosure may be directly performed by a hardware decoding processor, or may be performed by a combination of hardware and software modules in a decoding processor. The software module may be located in a mature storage medium in the art such as a RAM, a flash memory, a ROM, a programmable ROM or an electrically erasable programmable memory, and a register. The storage medium is located in the memory, and the processor reads the information in the memory and completes the operations of the above method in combination with its hardware.

It can be understood that the memory in the embodiment of the present disclosure may be a volatile memory or a non-volatile memory, or may include both volatile and non-volatile memories. The non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM) used as an external cache. By means of exemplary description but not restrictive description, many forms of RAM are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). It should be noted that, the memory in the system and the method described in the present disclosure is intended to include, but is not limited to, these memories and any other suitable types of memories.

Figure 6:
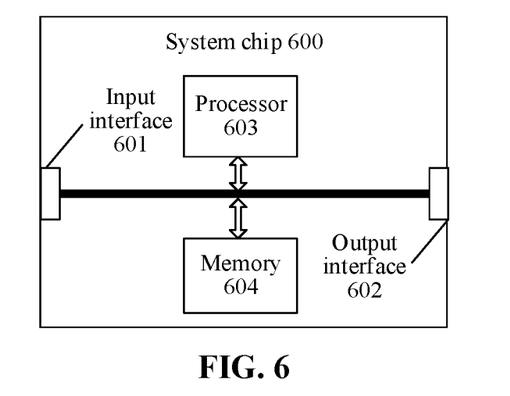
FIG. 6 is a schematic structural diagram of a system chip according to an embodiment of the present disclosure.

FIG. 6 is a schematic structural diagram of a system chip according to an embodiment of the present disclosure. The system chip 600 as shown in FIG. 6 may include an input interface 601, an output interface 602, at least one processor 603 and a memory 604. The input interface 601, the output interface 602, the processor 603 and the memory 604 can be connected to each other through an internal connection route. The processor 603 is configured to perform the codes in the memory 604.

Optionally, when the codes are performed, the processor 603 may implement the corresponding operations performed by the sending node in the method 200. For brevity, the details are not described here.

Optionally, when the codes are performed, the processor 603 may implement the corresponding operations performed by the receiving node in the method 200. For brevity, the details are not described here.

As illustrated above, the embodiments of the present disclosure can improve the efficiency of signal transmission between a sending node and a receiving node in an unlicensed frequency band. The technical solution is proposed from the aspects as below.

According to a first aspect, a method for signal transmission is provided. The signal transmission method may include: a request-to-send (RTS) signal sent by a sending node is received by a receiving node; and a clear-to-send (CTS) signal is sent by the receiving node to the sending node according to the RTS signal. The CTS signal may include beam information of N candidate beams, and N may be a positive integer.

Therefore, after the sending node sends the RTS signal to the receiving node, the receiving node may send the CTS signal to the sending node. By carrying the beam information of the N candidate beams into the CTS signal, the sending node may send a channel to the receiving node based on the beam information of the N candidate beams, thereby improving the efficiency of channel transmission between the sending node and the receiving node.

In a possible implementation, the RTS signal may be at least configured to request channel transmission between the sending node and the receiving node, and the CTS signal may be at least configured to indicate permission of the channel transmission between the sending node and the receiving node.

In a possible implementation, the method may further include: a channel sent by the sending node according to the beam information of the N candidate beams is received by the receiving node.

In a possible implementation, before the CTS signal is sent by the receiving node to the sending node according to the RTS signal, the method may further include: the beam information of the N candidate beams is determined by the receiving node according to a measurement result obtained by performing signal measurement on a reference signal and/or a sensing result obtained by performing carrier sensing on the N candidate beams.

In a possible implementation, the operation that the beam information of the N candidate beams is determined by the receiving node according to the measurement result obtained by performing signal measurement on the reference signal may include: signal measurement is performed by the receiving node on a plurality of reference signals sent by the sending node, and N reference signals with optimal measurement results are selected from the plurality of reference signals according to the measurement results of the plurality of reference signals; and sending beams of the N reference signals are taken by the receiving node as the N candidate beams.

In a possible implementation, the operation that the beam information of the N candidate beams is determined by the receiving node according to the sensing result obtained by performing carrier sensing on the N candidate beams may include: carrier sensing is performed by the receiving node on a plurality of beams; and N beams are selected from beams with channels sensed to be idle by the receiving node as at least one candidate beam.

In a possible implementation, the operation that the beam information of the N candidate beams is determined by the receiving node according to the measurement result obtained by performing signal measurement on the reference signal, and/or the a sensing result obtained by performing carrier sensing on the N candidate beams may include: signal measurement is performed by the receiving node on a plurality of reference signals sent by the sending node to obtain M reference signals with optimal measurement results, M being a positive integer greater than or equal to N; carrier sensing is performed by the receiving node on sending beams of the M reference signals; and N beams are selected by the receiving node from beams with channels sensed to be idle as the N candidate beams.

In a possible implementation, the operation that the beam information of the N candidate beams is determined by the receiving node according to the measurement result obtained by performing signal measurement on the reference signal and the sensing result obtained by performing carrier sensing on the N candidate beams may include: carrier sensing is performed by the receiving node on a plurality of beams to obtain M beams with channels sensed to be idle, M being a positive integer greater than or equal to N; signal measurement is performed by the receiving node on reference signals sent on the M beams; and sending beams of the N reference signals with optimal measurement results are taken as the N candidate beams by the receiving node.

In a possible implementation, the reference signal may include at least one of a channel state indication reference signal (CSI-RS), a sounding reference signal (SRS), and a synchronizing signal block (SSB).

In a possible implementation, the measurement result may include at least one of reference signal receiving power (RSRP), reference signal receiving quality (RSRQ), and signal to interference plus noise ratio (SINR).

In a possible implementation, the beam information of each candidate beam in the N candidate beams may be a signal index of a reference signal sent by each candidate beam used by the sending node.

In a possible implementation, the RTS signal may be sent by a first beam, and the N candidate beams may include the first beam or the N candidate beams do not include the first beam.

In a possible implementation, the channel may include a data channel or a control channel.

In a possible implementation, a value of N may be configured by a network device or pre-stored in the receiving node.

According to a second aspect, a method for signal transmission is provided. The signal transmission method may include that: an RTS signal is sent by a sending node to a receiving node; a CTS signal sent by the receiving node according to the RTS signal is received by the sending node, the CTS signal including beam information of N candidate beams, and N being a positive integer; and a channel is sent by the sending node to the receiving node according to the beam information of the N candidate beams.

Therefore, after the sending node sends the RTS signal to the receiving node, the receiving node may send the CTS signal to the sending node. By carrying the beam information of the N candidate beams into the CTS signal, the sending node may send the channel to the receiving node based on the beam information of the N candidate beams, thereby improving the efficiency of channel transmission between the sending node and the receiving node.

In a possible implementation, the RTS signal may be at least configured to request channel transmission between the sending node and the receiving node, and the CTS signal may be at least configured to indicate permission of the channel transmission between the sending node and the receiving node.

In a possible implementation, the operation that the channel is sent by the sending node to the receiving node according to the beam information of the N candidate beams may include: after receiving the CTS signal, the channel is sent to the receiving node by the sending node through one of the N candidate beams.

In a possible implementation, the operation that the channel is sent by the sending node to the receiving node according to the beam information of the N candidate beams may include: after receiving the CTS signal, the channel is sent to the receiving node by the sending node through a first beam and a first timer is started; and after the first timer expires, the channel is sent to the receiving node by the sending node through one of the N candidate beams.

In a possible implementation, the method may further include: after the channel is sent to the receiving node through the first beam, indication information is sent by the sending node to the receiving node, the indication information being configured to indicate a beam for subsequent channel transmission.

In a possible implementation, the indication information may be carried in control information or media access control (MAC) layer signaling.

In a possible implementation, the beam information of the N candidate beams may be signal indexes of N reference signals respectively sent by the N candidate beams used by the sending node.

In a possible implementation, the RTS signal may be sent by the first beam, and the N candidate beams may include the first beam or the N candidate beams do not include the first beam.

In a possible implementation, the channel may include a data channel or a control channel.

According to a third aspect, a receiving node is provided. The receiving node may perform the operations of the receiving node in the first aspect or any optional implementation of the first aspect. Specifically, the terminal device may include modular units configured to perform the operation of the receiving node in the first aspect or any possible implementation of the first aspect.

According to a fourth aspect, a sending node is provided. The sending node may perform the operations of the sending node in the first aspect or any optional implementation of the first aspect. Specifically, the network device may include modular units configured to perform the operations of the sending node in the second aspect or any possible implementation of the second aspect.

According to a fifth aspect, a receiving node is provided. The receiving node may include a processor, a transceiver and a memory. The processor, the transceiver and the memory can communicate with each other through an internal connection route. The memory is configured to store instructions, and the processor is configured to perform the instructions stored in the memory. When the processor performs the instructions stored in the memory, the receiving node can be caused to perform the method in the first aspect or any possible implementation of the first aspect, or the receiving node can be caused to implement the receiving node provided in the second aspect.

According to a sixth aspect, a sending node is provided. The sending node may include a processor, a transceiver and a memory. The processor, the transceiver and the memory can communicate with each other through an internal connection route. The memory is configured to store instructions, and the processor is configured to perform the instructions stored in the memory. When the processor performs the instructions stored in the memory, the sending node can be caused to perform the method in the second aspect or any possible implementation of the second aspect, or the sending node can be caused to implement the sending node provided in the fourth aspect.

According to a seventh aspect, a system chip is provided. The system chip may include an input interface, an output interface, a processor and a memory. The processor is configured to perform the instructions stored in the memory. When the instructions are performed, the processor may implement the method in the first aspect or any possible implementation of the first aspect.

According to an eighth aspect, a system chip is provided. The system chip may include an input interface, an output interface, a processor and a memory. The processor is configured to perform the instructions stored in the memory. When the instructions are performed, the processor may implement the method in the second aspect or any possible implementation of the second aspect.

According to a ninth aspect, a computer program product including instructions is provided. When the computer program product is run on a computer, the computer may perform the method in the first aspect or any possible implementation of the first aspect.

According to a tenth aspect, a computer program product including instructions is provided. When the computer program product is run on a computer, the computer may perform the method in the second aspect or any possible implementation of the second aspect.

It should be understood that in the embodiments of the disclosure, "B relevant to (corresponding to) A" means that B is associated with A, and B may be determined according to A. However, it should also be understood that determining B according to A does not mean determining B according to A only, and B may also be determined according to A and/or other information.

Those of ordinary skill in the art may realize that the units and algorithm operations of each example described in combination with the embodiments disclosed in the disclosure may be implemented by electronic hardware or a combination of computer software and the electronic hardware. Whether the functions are executed in a hardware or software manner depends on specific applications and design constraints of the technical solutions. Professionals may realize the described functions for each specific application by use of different methods, but such realization shall fall within the scope of the present disclosure.

Those skilled in the art can clearly understand that, for the convenience and brevity of description, the specific working processes of the system, apparatus and unit described above may refer to the corresponding processes in the foregoing method embodiments, and are not described in detail herein.

In several embodiments provided in the present disclosure, it should be understood that the disclosed system, apparatus and method may be implemented in other ways. For example, the apparatus embodiment described above is only schematic. For example, the division of the unit is only a logical function division. In actual implementation, there may be another division manner. For example, multiple units or components may be combined or integrated into another system, or some features may be ignored or not implemented. In addition, the displayed or discussed mutual coupling or direct coupling or communication connection may be indirect coupling or communication connection through some interfaces, apparatuses or units, which may be electrical and mechanical or adopt other forms.

The units described as separate components may or may not be physically separated. The components displayed as units may or may not be physical units, may be located in one place, or may be distributed on multiple network units. Some or all of the units may be selected according to actual needs to achieve the objective of the solution of the present embodiment.

In addition, each functional unit in each embodiment of the present disclosure may be integrated into one monitoring unit, or each of the units may exist separately physically, or two or more units may be integrated into one unit.

If the functions are implemented in the form of software functional units and sold or used as independent products, they may be stored in a computer-readable storage medium. Based on such understanding, the technical solution of the present disclosure is essentially a part that contributes to the conventional art or a part of the technical solution may be embodied in the form of a software product. The computer software product may be stored in a storage medium, and may include a plurality of instructions for causing a computer device (which may be a personal computer, a server, or a network device, etc.) to perform all or part of the operations of the method described in each embodiment of the present disclosure. The foregoing storage medium may include: a U disk, a mobile hard disk, an ROM, an RAM, a magnetic disk or an optical disk and other media capable of storing program codes.

The above is only the specific implementation mode of the present disclosure and is not intended to limit the scope of protection of the present disclosure. Any variations or replacements apparent to those skilled in the art within the technical scope disclosed by the present disclosure should fall within the scope of protection of the present disclosure. Therefore, the scope of protection of the present disclosure shall be subject to the scope of protection of the claims.

The invention claimed is:

1. A method for signal transmission, comprising:
   receiving, by a receiving node, a request-to-send (RTS) signal from a sending node; and
   sending, by the receiving node, a clear-to-send (CTS) signal to the sending node according to the RTS signal, wherein the CTS signal comprises beam information of N candidate beams, and N is a positive integer,
   wherein before sending, by the receiving node, the CTS signal to the sending node according to the RTS signal, the method further comprises:
   determining, by the receiving node, the beam information of the N candidate beams according to a measurement result obtained by performing signal measurement on a reference signal and/or a sensing result obtained by performing carrier sensing on the N candidate beams, wherein determining, by the receiving node, the beam information of the N candidate beams according to the measurement result obtained by performing signal measurement on the reference signal and the sensing result obtained by performing carrier sensing on the N candidate beams comprises:

performing, by the receiving node, signal measurement on a plurality of reference signals sent by the sending node to obtain M reference signals with optimal measurement results, wherein M is a positive integer greater than or equal to N;

performing, by the receiving node, carrier sensing on sending beams of the M reference signals; and selecting, by the receiving node, N beams as the N candidate beams from beams with channels sensed to be idle;

or, determining, by the receiving node, the beam information of the N candidate beams according to the measurement result obtained by performing signal measurement on the reference signal and the sensing result obtained by performing carrier sensing on the N candidate beams comprises:

performing, by the receiving node, carrier sensing on a plurality of beams to obtain M beams with channels sensed to be idle, wherein M is a positive integer greater than or equal to N;

performing, by the receiving node, signal measurement on reference signals sent on the M beams; and taking, by the receiving node, sending beams of N reference signals with optimal measurement results as the N candidate beams.

2. The method of claim 1, wherein the RTS signal is at least configured to request channel transmission between the sending node and the receiving node, and the CTS signal is at least configured to indicate permission of the channel transmission between the sending node and the receiving node.

3. The method of claim 1, further comprising:
receiving, by the receiving node, a channel from the sending node, the channel being sent by the sending node according to the beam information of the N candidate beams.

4. The method of claim 1, wherein the reference signal comprises at least one of a channel state indication reference signal (CSI-RS), a sounding reference signal (SRS), and a synchronizing signal block (SSB).

5. The method of claim 1, wherein the measurement result comprises at least one of reference signal receiving power (RSRP), reference signal receiving quality (RSRQ), and signal to interference plus noise ratio (SINR).

6. The method of claim 1, wherein the beam information of each candidate beam in the N candidate beams is a signal index of a reference signal sent by the each candidate beam used by the sending node.

7. The method of claim 1, wherein the RTS signal is sent by a first beam, and the N candidate beams comprise the first beam or the N candidate beams do not comprise the first beam.

8. The method of claim 3, wherein the channel comprises a data channel or a control channel.

9. The method of claim 1, wherein a value of N is configured by a network device or pre-stored in the receiving node.

10. A method for signal transmission, comprising:
sending, by a sending node, a request-to-send (RTS) signal to a receiving node;

receiving, by the sending node, a clear-to-send (CTS) signal from the receiving node, wherein the CTS signal is sent by the receiving node according to the RTS signal and comprises beam information of N candidate beams, and N is a positive integer; and sending, by the sending node, a channel to the receiving node according to beam information of the N candidate beams, wherein the beam information of N candidate beams is determined by the receiving node according to a measurement result obtained by performing signal measurement on a reference signal and/or a sensing result obtained by performing carrier sensing on the N candidate beams, wherein determining, by the receiving node, the beam information of the N candidate beams according to the measurement result obtained by performing signal measurement on the reference signal and the sensing result obtained by performing carrier sensing on the N candidate beams comprises:

performing signal measurement on a plurality of reference signals sent by the sending node to obtain M reference signals with optimal measurement results, wherein M is a positive integer greater than or equal to N;

performing carrier sensing on sending beams of the M reference signals; and selecting N beams as the N candidate beams from beams with channels sensed to be idle;

or, determining, by the receiving node, the beam information of the N candidate beams according to the measurement result obtained by performing signal measurement on the reference signal and the sensing result obtained by performing carrier sensing on the N candidate beams comprises:

performing carrier sensing on a plurality of beams to obtain M beams with channels sensed to be idle, wherein M is a positive integer greater than or equal to N;

performing signal measurement on reference signals sent on the M beams; and taking sending beams of N reference signals with optimal measurement results as the N candidate beams.

11. The method of claim 10, wherein sending, by the sending node, the channel to the receiving node according to the beam information of the N candidate beams comprises:
sending, by the sending node, the channel to the receiving node through one of the N candidate beams, after receiving the CTS signal;

or, sending, by the sending node, the channel to the receiving node through a first beam and starting a first timer, after receiving the CTS signal, and sending, by the sending node, the channel to the receiving node through one of the N candidate beams, after the first timer expires.

12. A receiving node, comprising:
a processor; and
a transceiver, connected to the processor and configured to receive a request-to-send (RTS) signal from a sending node and to send a clear-to-send (CTS) signal to the sending node according to the RTS signal, wherein the CTS signal comprises beam information of N candidate beams, and N is a positive integer, wherein the processor is configured to:

determine the beam information of the N candidate beams according to a measurement result obtained by performing signal measurement on a reference signal and/or a sensing result obtained by performing carrier sensing on the N candidate beams, wherein the processor is specifically configured to:

perform signal measurement on a plurality of reference signals sent by the sending node to obtain M reference signals with optimal measurement results, perform carrier sensing on sending beams of the M reference signals, and select, from beams with channels sensed to be idle, N beams as the N candidate beams, M is a positive integer greater than or equal to N; or, perform carrier sensing on a plurality of beams to obtain M beams with channels sensed to be idle, wherein M is a positive integer greater than or equal to N, perform signal measurement on reference signals sent on the M beams, and take sending beams of N reference signals with optimal measurement results as the N candidate beams.

13. A sending node, comprising:

a transceiver, configured to send a request-to-send (RTS) signal to a receiving node; further configured to receive a clear-to-send (CTS) signal from the receiving node, wherein the CTS signal is sent by the receiving node according to the RTS signal and comprises beam information of N candidate beams, and N is a positive integer; and further configured to send a channel to the receiving node according to the beam information of the N candidate beams, wherein the beam information of N candidate beams is determined by the receiving node according to a measurement result obtained by performing signal measurement on a reference signal and/or a sensing result obtained by performing carrier sensing on the N candidate beams, wherein determining, by the receiving node, the beam information of the N candidate beams according to the measurement result obtained by performing signal measurement on the reference signal and the sensing result obtained by performing carrier sensing on the N candidate beams comprises:

performing signal measurement on a plurality of reference signals sent by the sending node to obtain M reference signals with optimal measurement results, wherein M is a positive integer greater than or equal to N;

performing carrier sensing on sending beams of the M reference signals; and selecting N beams as the N candidate beams from beams with channels sensed to be idle;

or, determining, by the receiving node, the beam information of the N candidate beams according to the measurement result obtained by performing signal measurement on the reference signal and the sensing result obtained by performing carrier sensing on the N candidate beams comprises:

performing carrier sensing on a plurality of beams to obtain M beams with channels sensed to be idle, wherein M is a positive integer greater than or equal to N;

performing signal measurement on reference signals sent on the M beams; and taking sending beams of N reference signals with optimal measurement results as the N candidate beams.

14. The sending node of claim 13, wherein the transceiver is specifically configured to:

send the channel to the receiving node through one of the N candidate beams after receiving the CTS signal; or send the channel through a first beam to the receiving node and start a first timer, after receiving the CTS signal, and send the channel through one of the N candidate beams to the receiving node after the first timer expires; or send indication information to the receiving node after sending the channel to the receiving node through a first beam, wherein the indication information is configured to indicate a beam for subsequent channel transmission.

15. The sending node of claim 14, wherein the indication information is carried in control information or media access control (MAC) layer signaling.

* * * * *